G. E. NEEDHAM.
RETAINING MEANS FOR PLOWSHARES.
APPLICATION FILED NOV. 5, 1917.
1,300,453.
Patented Apr. 15, 1919.
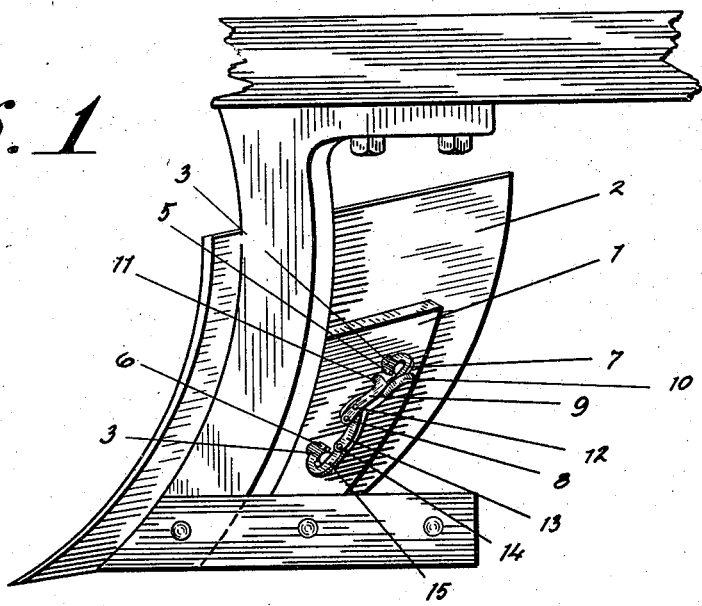
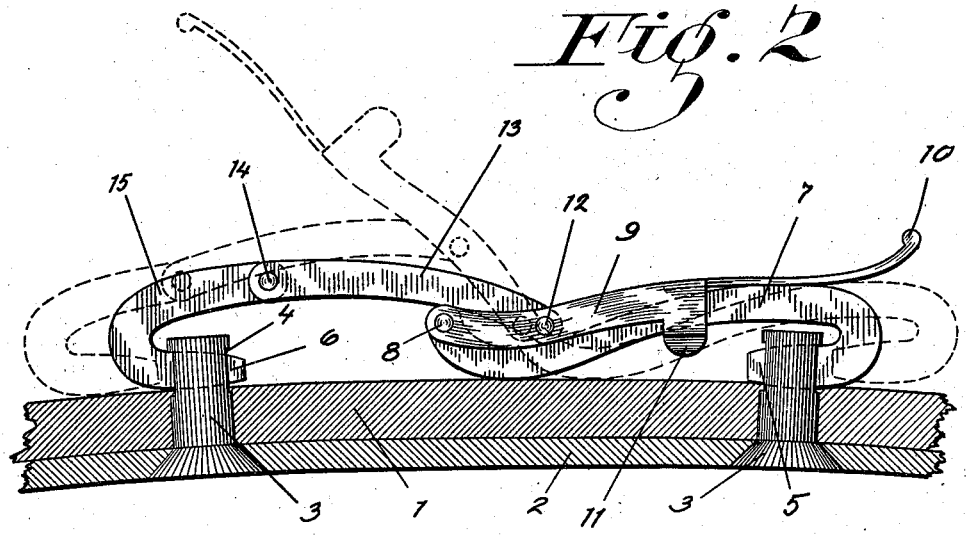
WITNESS:
Bernard Privat
INVENTOR.
Guy E. Needham
BY
S. Webster
ATTORNEY

UNITED STATES PATENT OFFICE.

GUY E. NEEDHAM, OF TRACY, CALIFORNIA.

RETAINING MEANS FOR PLOWSHARES.

1,300,453.

Specification of Letters Patent.

Patented Apr. 15, 1919.

Application filed November 5, 1917. Serial No. 200,424.

*To all whom it may concern:*

Be it known that I, GUY E. NEEDHAM, a citizen of the United States, residing at Tracy, in the county of San Joaquin, State of California, have invented certain new and useful Improvements in Retaining Means for Plowshares; and I do declare the following to be a full, clear, and exact description of the same, reference being had to the accompanying drawings, and to the characters of reference marked thereon, which form a part of this application.

This invention relates to improvements in the means for removably securing the plow shares to the frog of a plow. This is now commonly done by the use of the ordinary nuts and bolts, there always being a plurality of bolts and nuts for each plow share. It is constantly necessary to remove and replace the plow shares due to wear and other causes and in the present day form of retaining means it requires a great amount of time to remove and replace all the nuts and bolts, and many times the same become battered and rusted so that it becomes very difficult to remove them at all.

My improved invention therefore, is aimed to produce a retaining means which can be instantly positioned or removed and also one in which the bolts may be replaced by pins or lugs formed integral with the plow share, thus doing away with removable bolts and nuts.

The retaining means can be used on a detachable, reversible or any other kind of plow share, or on any form of plow point used with the mold board, and can also be used on land sides, disk plows, or in fact many other kinds of machinery where it is found adaptable.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a perspective view of a reversible mold board showing the same secured to the frog of the plow by one of my improved retaining clamps.

Fig. 2 is a side elevation of the retaining clamp showing the position it assumes when the reversible mold board is fastened.

Referring now more particularly to the characters of reference on the drawings, the numeral 1 designates the frog or other part of the plow to which is secured the mold board 2. My improved retaining means embodies pins or lugs 3 which may be independent of or formed integral with the mold board 2 and project through the frog or other part 1. On their outer ends these pins 3 are provided with slots 4. My improved clamp provides tapered keys 5 and 6, adapted to project into the slots 4 and to be drawn tight therein so as to lock the pins 3 in position through the frog 1. These keys are joined together and operated by means of the following structure: The key 5 is provided with an arm 7 which curves back over the pin 3. On the outer end of the arm 7 as at 8 is a lever 9 which is provided with an operating handle 10 and clips 11, whereby it may be held stationary by engagement with the said arm 7. At a spaced distance from the point 8 as at 12 on lever 9 is a pivoted link 13, which link is pivoted at its opposite end as at 14 to an arm 15, formed on the key 6 and curving back over the top of the other pin 3.

In practice when it is desired to clamp the pins 3 in position the lever 9 is moved to the position shown by dotted lines in Fig. 2. This action, through a medium of the link 13, spreads the keys 5 and 6 apart. Said keys are positioned adjacent the slots 4. The lever 9 is then moved into position shown by solid lines in Fig. 2. This draws the keys 5 and 6 toward each other and clamps them securely into the slots 4, thus locking the pins 3 stationary through the frog,—and hence clamping the mold board in position. The clips 11 prevent the lever 9 from loosening with the vibration of the plow.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a plow, the combination with the frog and mold board thereof, of a pair of pins on the mold board arranged to removably project through the frog, each pin being provided with a transverse slot, and means independent of the frog to frictionally lock the mold board stationary on the frog comprising a pair of arms, each having a tapered end adapted to project into the slot in each pin to frictionally engage one end of the slot and the frog, a lever pivoted to the outer end of one arm, and a link pivotally connected to the lever and to the outer end of the other arm.

2. In a plow having a frog and mold board, the combination with a pair of pins on the mold board arranged to removably project through the frog, each provided with a transverse slot, of means independent of the frog and mold board to lock the mold board stationary on the frog, such means comprising a tapered key arranged to be projected into each slot from the farther end thereof, an arm on each key arranged to pass over the tops of the pins, a lever pivoted to the outer end of one of the arms, and a link pivoted to the lever and to the outer end of the other arm, said pivotal points on the lever being suitably spaced apart whereby when the lever is pulled down, the keys will be forcibly pulled into the slots in the pins to frictionally engage one end of the slots and the frog.

In testimony whereof I affix my signature in the presence of two witnesses.

GUY E. NEEDHAM.

Witnesses:
ROY E. NEEDHAM,
LLOYD I. TILTON.

Copies of this patent may be obtained for five cents each, by addressing the "Commissioner of Patents, Washington, D. C."